Figure 1:
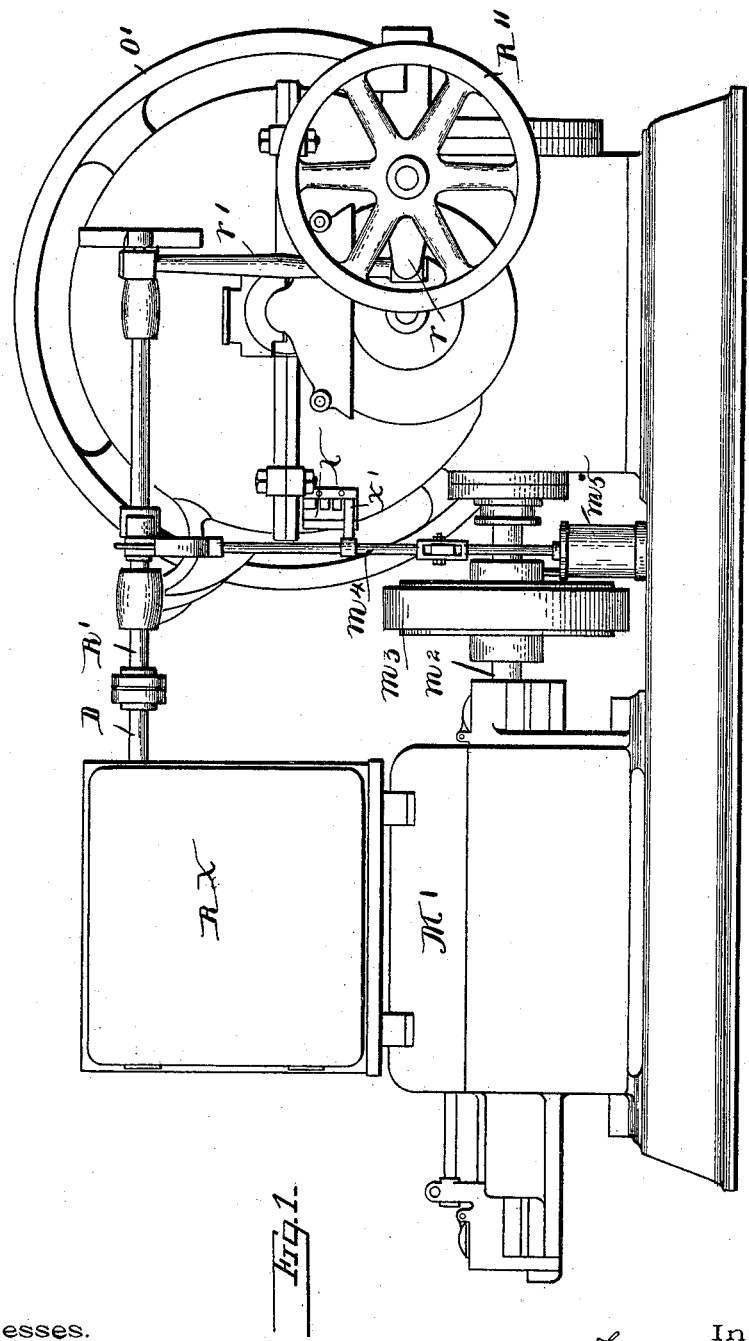

(No Model.) 5 Sheets—Sheet 1.

F. E. HERDMAN.
CONSTRUCTION AND OPERATION OF CIRCUITS FOR ELECTRIC MOTORS.

No. 568,566. Patented Sept. 29, 1896.

Witnesses.
Jesse B. Keller
Philip Boutelye

Inventor.
Frank E. Herdman
[signature]
Attorney.

(No Model.) 5 Sheets—Sheet 2.
F. E. HERDMAN.
CONSTRUCTION AND OPERATION OF CIRCUITS FOR ELECTRIC MOTORS.
No. 568,566. Patented Sept. 29, 1896.
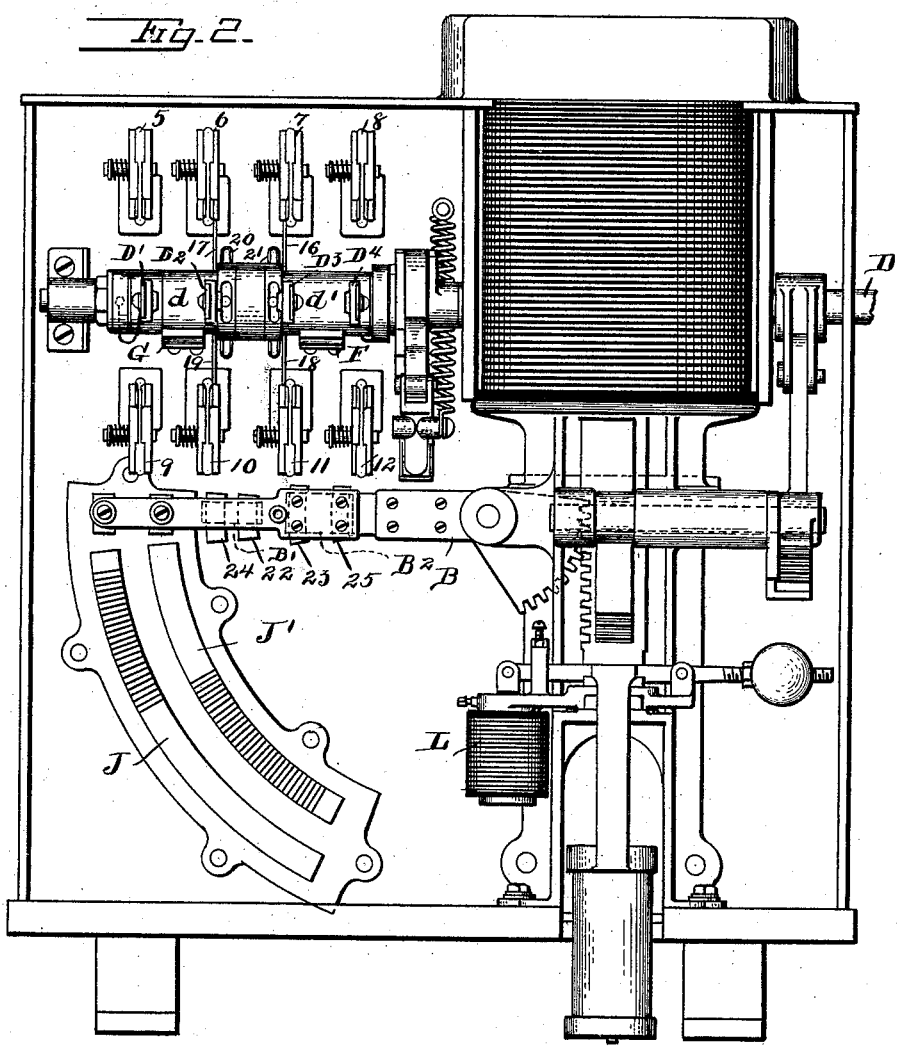
Witnesses.
Jesse B. Heller.
Philip Bouteley
Inventor.
Frank E. Herdman
W. H. Hulbert
Attorney.

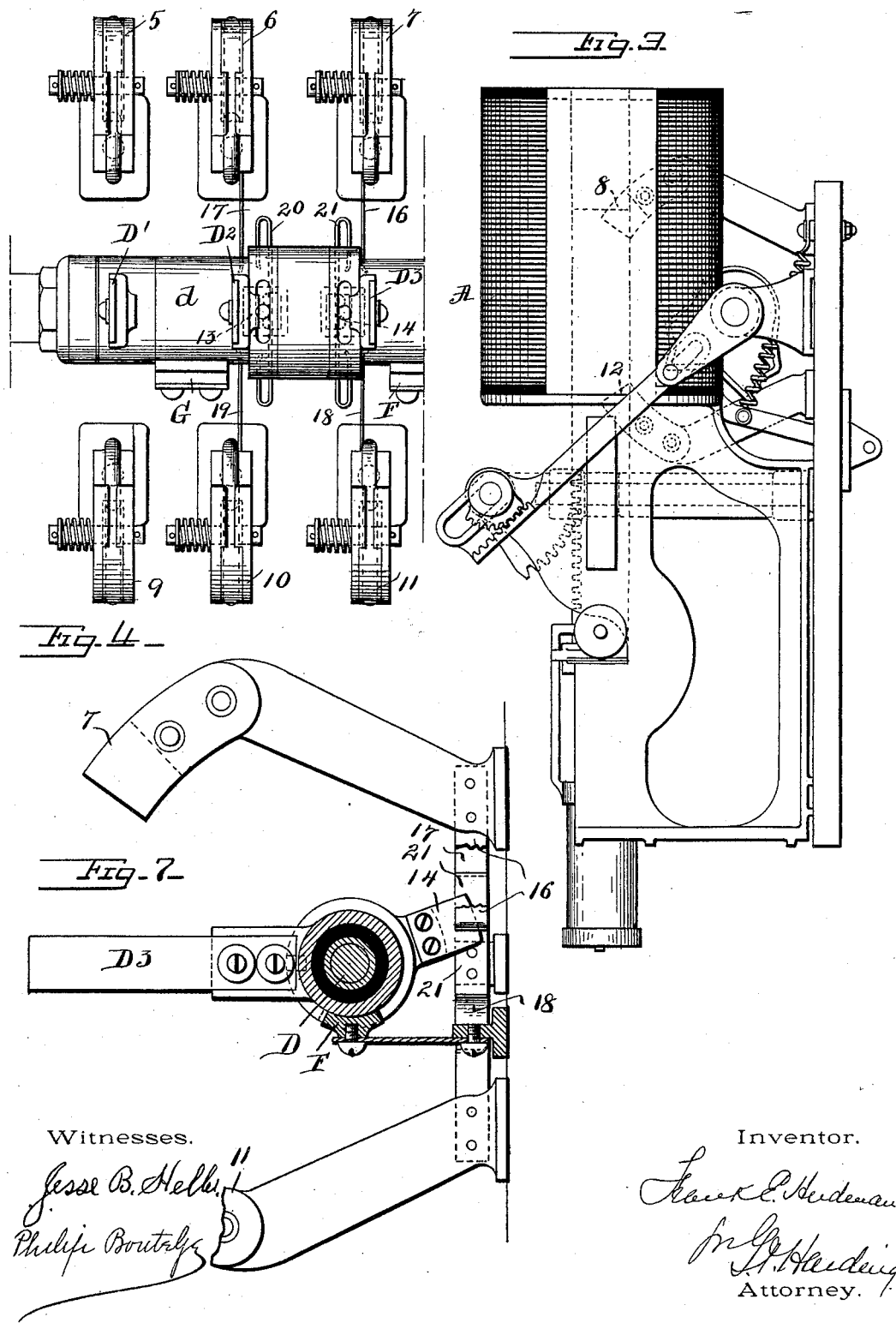

(No Model.) 5 Sheets—Sheet 4.
F. E. HERDMAN.
CONSTRUCTION AND OPERATION OF CIRCUITS FOR ELECTRIC MOTORS.
No. 568,566. Patented Sept. 29, 1896.
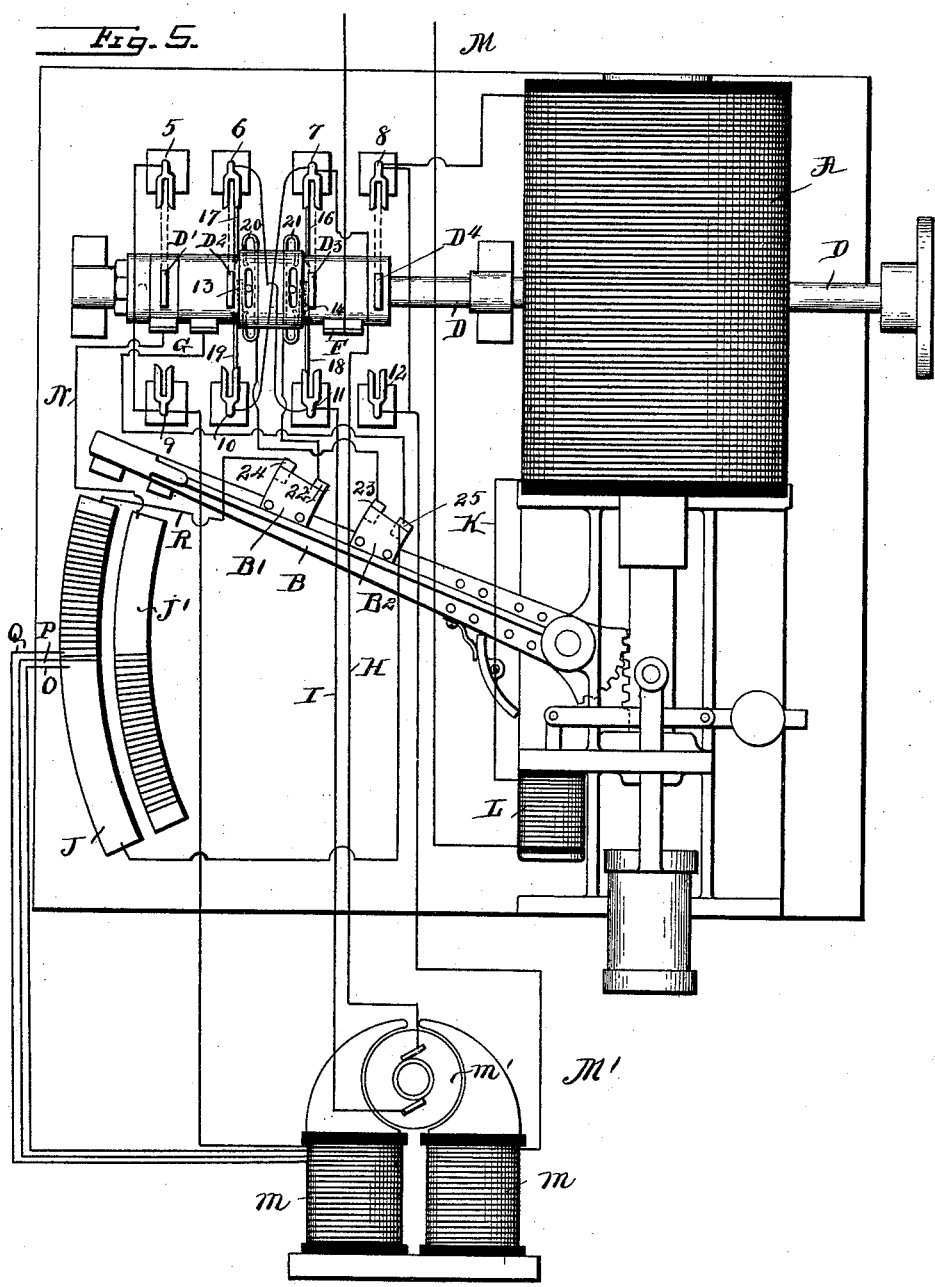
Witnesses.
Jesse B. Heller
Philip Boutelje
Inventor.
Frank E. Herdman
Attorney.

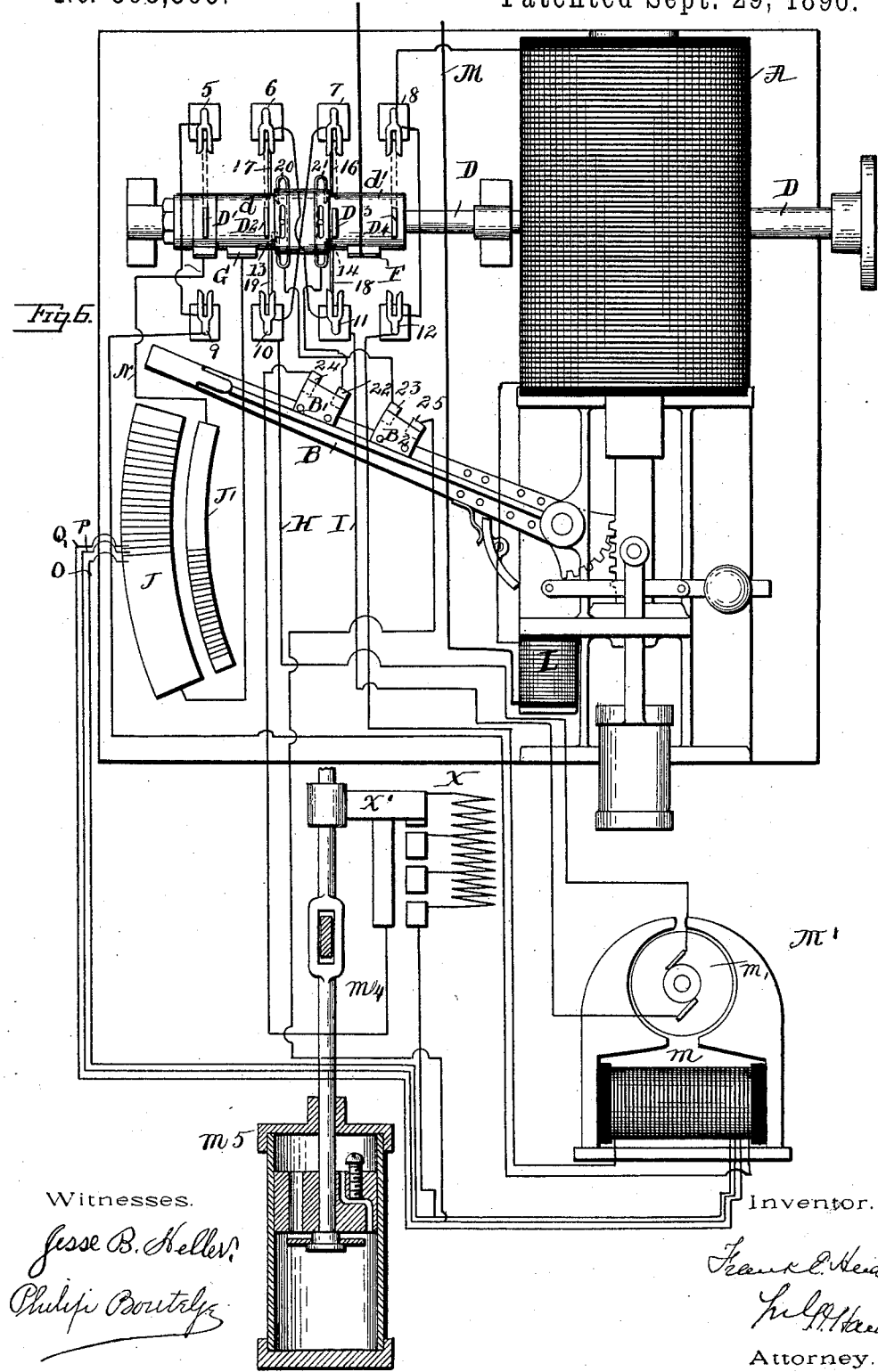

UNITED STATES PATENT OFFICE.

FRANK E. HERDMAN, OF WINNETKA, ILLINOIS.

CONSTRUCTION AND OPERATION OF CIRCUITS FOR ELECTRIC MOTORS.

SPECIFICATION forming part of Letters Patent No. 568,566, dated September 29, 1896.

Application filed June 21, 1895. Serial No. 553,561. (No model.)

*To all whom it may concern:*

Be it known that I, FRANK E. HERDMAN, a citizen of the United States, residing at Winnetka, county of Cook, and State of Illinois, have invented a new and useful Improvement in the Construction and Operation of Circuits to Electric Motors, of which the following is a full, clear, and exact description, reference being had to the accompanying drawings, which form a part of this specification.

My invention is intended for use with electric motors, and is especially adapted for use with electric motors which are used to operate elevators; and, broadly considered, it consists in, first, forming a brake device from the motor by closing the armature-circuit through the series coils of the field; second, causing this to occur independent of and when the power-circuit is cut off; third, the transformation of a shunt, compound, or series wound motor into a series-wound dynamo independent of the power-circuit; fourth, the transformation of the motor into a dynamo when for any cause the power-circuit is broken.

I will now describe my invention as illustrated in the drawings, and then particularly point out the invention in the claims.

In the drawings, Figure 1 is a side elevation of the elevator-machine. Fig. 2 is a front view of the switches. Fig. 3 is an end view of the same. Fig. 4 is an enlarged front view of some of the switches. Fig. 5 is a diagram showing the electrical connections. Fig. 6 is a similar view, modified form. Fig. 7 is an end view of Fig. 4.

$M'$ represents the motor, of which $m$ are the field-magnets, and $m'$ the armature.

$R^\times$, Fig. 1, is the box of switch and rheostat mechanism; $R'$, the operating-bar; $R''$, the operating-sheave, which is connected to the operating-bar by the crank $r$ and connecting-rod $r'$.

$m^2$ is the motor-shaft; $m^3$, the brake-wheel on the motor-shaft; $m^4$, the brake-rod, and $m^5$ a dash-pot controlling the movement of brake-rod $m^4$.

$O'$ is the winding-drum driven from the shaft $m^2$ of the motor $M'$. The snap-switch for controlling the admission of current to the motor consists of the shaft D, connected with the operating-bar $R'$. Upon this shaft D and insulated therefrom is the hub $d$, of electric conducting material. Connected to this hub $d$ are four blades $D'$ $D^2$ $D^3$ $D^4$, the blades being shown in detail, Figs. 4 and 7. The blade $D'$ is insulated upon the hub from blade $D^2$. Blades $D^3$ and $D^4$ are electrically connected upon the hub, but are insulated from the other blades.

5, 6, 7, and 8 are a series of brushes above and 9, 10, 11, and 12 are a series of brushes below the switch, brushes 5, 6, 7, and 8 being in line of movement, respectively, with blades $D'$ $D^2$ $D^3$ $D^4$ in their movement in one direction and brushes 9, 10, 11, and 12 in their line of movement in the other direction.

F is a brush connected with the wire leading from the pole of one source of current supply and resting against the hub $d'$, to which blades $D^3$ and $D^4$ are secured. Brushes 6 and 11 are connected by a wire, and brushes 7 and 10 are also connected by a wire. Brush G is in electrical connection with the hub to which brush $D^2$ is connected.

When the switch is closed, say, upward and the blades $D'$ $D^2$ $D^3$ $D^4$ brought into contact with the brushes 5, 6, 7, and 8, respectively, the current enters, by means of the brush F, to the blades $D^3$ and $D^4$ and passes from blade $D^3$ to brush 7 and from brush 7, by means of wire H, to the armature. It returns from the armature, by means of the wire I, to the brush 6, and from brush 6 the current passes to the blade $D^2$, thence to the brush G, from the brush G to the armature-resistance contacts J, from thence through the resistance-arm B, through the wire K to the regulating-solenoid L, and from thence to the other pole of the source of current supply through the wire M. Brush 7 being cross-connected with brush 10 and brush 6 with brush 11 enables the current to be reversed in the armature when the switch is turned in the opposite direction. The brushes 8 and 12 are also connected with each other, and through the medium of the brush F the current passes directly to one side of one of the windings to the field, which, as may be seen, is thus in shunt with the armature, there being two windings to the field, the one just spoken of in shunt with the armature, the other winding, as will hereinafter be spoken of, in a circuit independent of the current supply and in series with the armature-winding. From the other side of this winding a wire leads to brushes 5 and 9. Blade D', which coacts with these brushes by means of the wire N, is connected with field-resistance contacts J' and, through arm B, in electrical connection with the other pole of current supply. As a result, as soon as the resistance-arm closes with the rheostat-contacts the current is completed not only to the armature, but to the shunt-field. The purpose of insulating blade D' from $D^2$ is to prevent the short-circuiting of the armature-resistances. From brushes 8 and 12 a wire is run to one side of the solenoid A, which controls the movement of the resistance-arm B, and the wire in the opposite direction runs directly from the solenoid A to the source of current supply or main line. Consequently in bringing the blade $D^4$ to the center in either direction, that is, breaking the connection between blade $D^4$ and either brush 8 or brush 12, the resistance-arm solenoid, as well as the field-circuit, is broken, the general results, so far as described here, being the same as those obtained in the ordinary reversing-switch.

I will now describe the electrical construction whereby the motor is changed into a dynamo independent of the main circuit, as follows, (see Fig. 5:)

The principle involved is that whenever the circuit is opened from the motor the armature of the machine will be short-circuited and have in this circuit the series field-coils of the machine, thereby turning the motor into a series dynamo. As a result, the current produced by this motor as a dynamo will be in proportion to the speed at which it is running, and the fields will be strengthened accordingly. Thus the motor tends to stop the movement of whatever was being driven by it, and the resistance which it offers to the further movement of the machine driven by it will be in proportion to the load of the machine, as in the case of an elevator, and the speed at which it is traveling, which gives in function a brake with a varying strength, greater or smaller, according to the greater or less work it has to overcome.

In the past an arrangement has been used by which by leaving the circuit constantly closed through the shunt-field and short-circuiting the armature when the main current is cut off, the armature turning, the machine is changed into a shunt-dynamo. The arrangement which I am now about to describe differs from this in the fact that the main circuit is cut off from the motor entirely, and after this is done the motor is turned into a dynamo with the series field in circuit, which gives better results than with the shunt connection and permits of the outside circuit being entirely broken.

The blades 13 and 14 are attached to the hub of blades $D^2$ and $D^3$ and insulated from the same. In Fig. 7 of course but one blade is shown. These blades are so connected to the hub that they have a certain amount of slip, the limit being shown in Figs. 4 and 7.

To brushes 6 and 7 are attached the brushes 16 and 17, and to brushes 10 and 11 are attached brushes 18 and 19. Close to brushes 17 and 19 is placed a brush 20, one end being close to brush 17 and the other end being close to brush 19. Brush 21 is similarly placed in reference to brushes 16 and 18, so that the movement of the blade, say 14, in one direction will make connection between brushes 16 and 21 and in the other direction 18 and 21. Therefore when the snap-switch is thrown in one direction by means of blades 13 and 14, the brush 17 is brought in contact with brush 20 and brush 16 with brush 21. Brush 21 is connected by a wire to contact 22, and brush 20 is connected by a wire with contact 23. Near contact 22 is placed a contact 24, which is connected with the armature-contacts J. Near contact 23 is placed a contact 25, which is connected with a wire connection between the brush G and the contacts J. To the resistance-arm B are attached two brushes B' and $B^2$, which are insulated from the same. One brush, B', covers the contacts 22 and 24 and the other brush the contacts 23 and 25, thereby, when the switch is at its extreme upper position, giving electrical connection between the brushes 22 and 24 and the brushes 23 and 25.

When the switch is operated to admit current from the main circuit, the resistance-arm is not in connection with the resistance-contacts, and as a consequence no current passes to the armature or the field of the motor until contact is made between the resistance-arm and the resistance-contact, which does not take place until after its connection with contacts 22 and 24 and 23 and 25 is broken. Therefore there is no short-circuiting when the initial operation of the machine occurs.

In stopping the machine the snap-switch is moved so as to cut off the main current, but owing to the slip of the blades 13 and 14 they still retain contact between the brushes 17 and 20 and 16 and 21. As a result, when the switch-arm returns to its initial position and connects the contacts 22 and 24 and contacts 23 and 25, the following occurs: The snap-switch being open, the main circuit is cut off the machine, and in consequence of the resistance-arm being returned to its extreme position the current is cut off from the main brush F.

Following now the connections, commencing with the armature-wire, we have as follows: O P Q are wires leading to and from the series winding of the field and armature-resistance contacts J. Any number of these may be used. When the motor is acting as a motor and the current initially admitted through the medium of resistance-arm B, the full series coils of field are charged. When the arm B passes beyond wire Q, only the winding from leads O and P receive current. When the arm B passes beyond the lead P, the series winding of the field is cut off from the current. Now, taking the position of the switch and arm as shown in Fig. 5, the circuit is as follows: Commencing with the upper brush of armature $m'$ the current passes through wire H, brush 7 by wire to brush 10, from brush 19 to brush 20 by blade 13, from brush 20 by wire to contact 23, from contact 23 to contact 25 by means of brush $B^2$, from contact 25 to armature-contacts J, from said plate by wire O through the series fields back through wire Q to armature-resistance contacts J, thence by wire R to contact 24, from contact 24 to contact 22 by brush $B'$, from contact 22 by wire to brush 21, from brush 21 to brush 18 by means of blade 14, from brush 18 to brush 11, from brush 11 by means of wire I to the other side of the armature. Thus we have a circuit including the armature and field and independent of current supply.

In throwing the snap-switch in the opposite direction the conditions between the armature and the field are reversed, so that in either way the motor is moving the opening in the snap-switch causes it to become a dynamo and generate current as such.

In Fig. 6 I have shown a somewhat-modified arrangement. The switches are the same, but instead of connecting the series wires of the field through the medium of the armature-resistance this additional resistance is controlled by the operation of the brake mechanism. The connection with the contact 24, instead of running to the resistance-contacts J, as shown in Fig. 5, passes to the resistance X, and the wire returning from the resistance X passes through and connects with the first wire of the series field-coils of the motor. The last wire of these series coils passes to and connects with contact 25 instead of at the other end of resistance-contact J, as shown in the previous description. In this method the armature-resistance is left entirely out of the circuit. The contacts for the additional resistance are placed in line with a brush $X'$, attached to the rod connecting the brake-lever with the operating-bar $R'$. At the lower end of this rod is placed the dash-pot $m^5$, the piston of this dash-pot being attached to the rod. When the operating-bar $R'$ is thrown in either direction, the brush attached to the connecting-rod is raised over the resistance-contact, throwing the entire resistance in the circuit. When the operating-bar is thrown to the center to break the main circuit, the connecting-rod is lowered and the resistance is gradually cut out of the dynamo-circuit, and in consequence, as the dynamo slows down and the voltage which it generates drops, the resistance is cut out of this circuit, so as to admit of a greater passage of current at this lower voltage, thereby maintaining the retarding force due to the motor acting as a dynamo. While this resistance is shown with a brake, in many cases the brake will be superfluous, as the dynamo running as a motor would fill all the requirements, for when the operating mechanism is central and the resistance entirely cut out of this electric brake-circuit a very slight movement of the armature would generate current sufficient to hold it. In any case there would only be needed a light brake.

Having now fully described my invention, what I claim, and desire to protect by Letters Patent, is—

1. In combination with a source of current supply, a motor having armature and double-field windings, independent circuits, one circuit including the armature-winding and source of current supply, one field-winding being in shunt with said circuit, the other circuit including the armature and other field-coil in series and independent of the source of current supply, a switch device controlling both circuits, the arrangement being such that when the switch device closes one circuit it opens the other, and vice versa.

2. In combination with a motor and source of current supply, of a switch provided with a hub of conducting material, adapted to rock, four electric conducting-blades connected with said hub, the two central blades being insulated from each other and the blade at one end of said hub, one of said central blades being electrically connected with the other end blade, electrical connection with the source of current supply and said hub between said last-mentioned blades, a series of brushes above and below said blades equal in number and corresponding to said blades, the two central brushes above and below being cross-electrically connected as described, and the end brushes being electrically connected as described, brushes at one end being in direct electrical connection with the field of the motor, the brushes at the other end being in connection with the field of the motor and the source of current supply through a secondary switch device, one pair of the central brushes being directly connected with the armature and with the source of current supply through the primary switch, the other pair to the field and the source of current supply, through said second switch device.

3. In combination with a motor and source of current supply, of a switch provided with a hub of conducting material, adapted to rock, four electric conducting-blades connected with said hub, the two central blades being insulated from each other and the blade at one end of said hub, one of said central blades being electrically connected with the other blade, electrical connection with the source of current supply and said hub between said last-mentioned blades, a series of brushes above and below said blades equal in number and corresponding to said blades, the two central brushes above and below being cross-electrically connected as described, and the end brushes being electrically connected as described, brushes at one end being in direct electrical connection with the field of the motor, the brushes at the other end being in connection with the field of the motor and the source of current supply through a secondary switch device, one pair of the central brushes being directly connected with the armature and with the source of current supply through the primary switch, the other pair to the field and the source of current supply through said secondary switch device, blades as 13 and 14 connected to and insulated from the central blades, said blades 13 and 14 being adapted to slip, brushes as 16 and 17 attached to the upper central brushes, brushes as 18 and 19 attached to the lower central brushes, a brush as 20 connected to one pair of central main brushes, and another brush as 21 connected to the other pair of central main brushes, the blades and brushes coacting as described, a circuit including the brushes 20 and 21, the secondary switch device, the armature and the field, the arrangement being such that when the second switch closes the power-circuit to the motor, it opens the circuit through brushes 20 and 21, and when the switch device opens the power-circuit to the motor it closes the circuit through brushes 20 and 21.

In testimony of which invention I have hereunto set my hand.

FRANK E. HERDMAN.

Witnesses:
A. K. ADLER,
T. C. MORRIS.